Nov. 11, 1969  C. E. PLYMALE  3,477,892
METHOD AND APPARATUS FOR FORMING PLASTIC TUBULAR NETTING
Filed Jan. 21, 1966  2 Sheets-Sheet 1

INVENTOR
CHARLES E. PLYMALE

BY W. A. Schaich & Philip M. Rice
ATTORNEYS

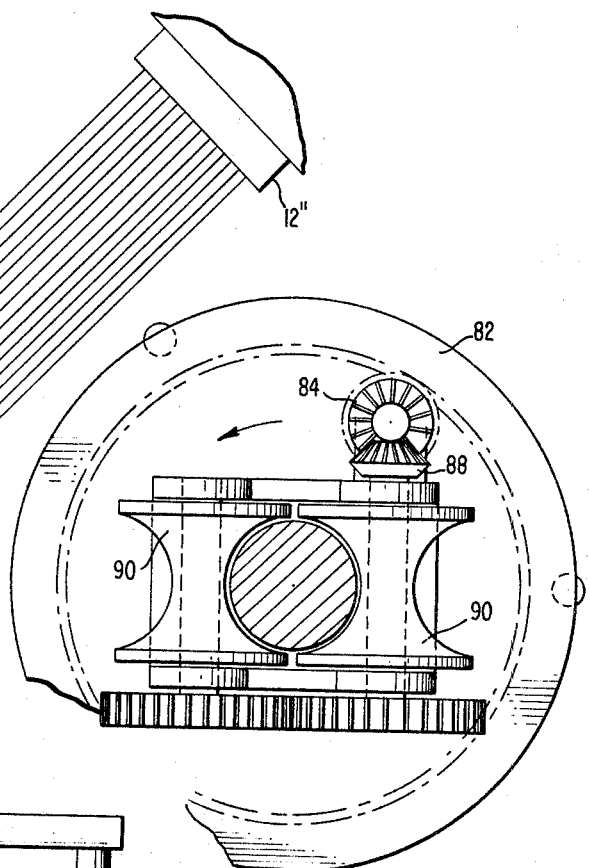
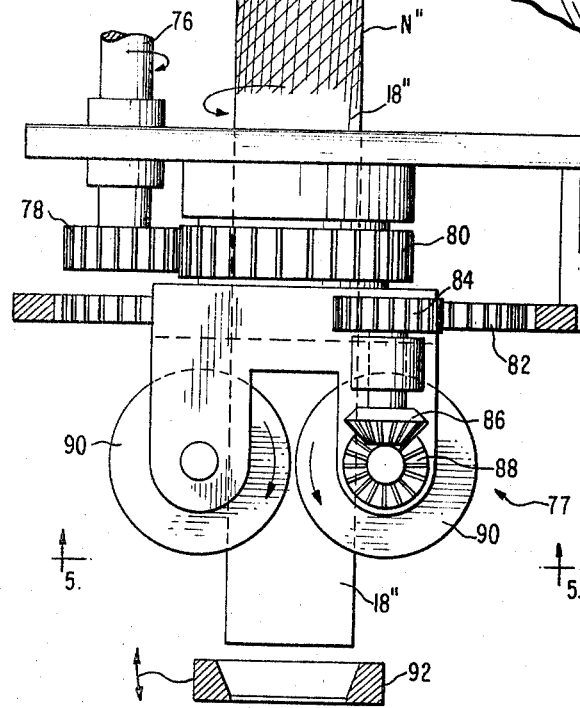
FIG.4
FIG.5
INVENTOR
CHARLES E. PLYMALE
ATTORNEYS

United States Patent Office 3,477,892
Patented Nov. 11, 1969

3,477,892
METHOD AND APPARATUS FOR FORMING PLASTIC TUBULAR NETTING
Charles E. Plymale, Maumee, Ohio, assignor to Owens-Illinois, Inc., a corporation of Ohio
Filed Jan. 21, 1966, Ser. No. 522,209
Int. Cl. D04h *3/16;* B29d *23/04*
U.S. Cl. 156—167       15 Claims

ABSTRACT OF THE DISCLOSURE

Extruding a first group of plastic strands in a circular array, extruding a second group of plastic strands in a planar array crossing over strands in the first group, and rotating at least one of the groups to form tubular open mesh netting. Rotation of one of the groups of strands may be achieved by a rotating mandrel position in the strands in circular array, or by rotating a die which forms the strands in planar array around the axis of the strands in circular array. After the netting is formed, a take-up mechanism advances it through a vertical guide mechanism to a supply roll. In one embodiment, the vertical guide mechanism is rotatable at the same speed and in the same direction as the rotating mandrel.

---

The present invention relates generally to a process and apparatus for producing plastic net and more particularly to a process and apparatus for producing plastic net from organic plastic materials by means of annular and planar arrangements of extrusion nozzles.

Heretofore plastic net has been produced by the extrusion of two sets of strands of plastic material from each of two circular dies concentrically arranged. One common arrangement of the circular dies is to have the inner die member which produces one set of strands, to rotate relative to the other die member and cause a crisscross pattern of the strands when the strands formed by the outer die are brought into contact with the inner set of strands. However, this construction has resulted in certain problems in connection with the fabrication and operation of the dies.

Accordingly, it is a primary object of this invention to provide a new and improved apparatus and process for producing tubular plastic net.

A further object of this invention is to provide a new and improved apparatus and process for producing multi-colored tubular net.

A further object of this invention is to provide a new and improved apparatus and process for producing tubular plastic net wherein the strands thereof would be more uniform by controlling the extrusion rate, take-off rate and mandrel speed.

Other aspects, advantages and features of the invention will be apparent from the following description taken in conjunction with the drawings and appended claims.

In accordance with the present invention a process and apparatus are provided whereby plastic net is formed in a single operation by first extruding about an axis from one source of plastic a group of soft and tacky plastic strands in circular array, then extruding a second group of soft and tacky plastic strands in a parallel planar array and at an angle to said first group and also about the same axis, and thereafter rotating at least one group of strands to cross the other group of strands and bond at the crossings thereby to form continuously an open mesh unitary plastic fabric of indefinite length.

The nature of the present invention will be apparent from the following description and the accompanying drawings forming a part of this specification.

In the drawings:

FIG. 4 is a schematic front view of a modification showing a take-up means positioned below the rotary mandrel in addition to severing means; and FIG. 5 is a cross-section of FIG. 4 taken along line 5—5.

Figure 1:
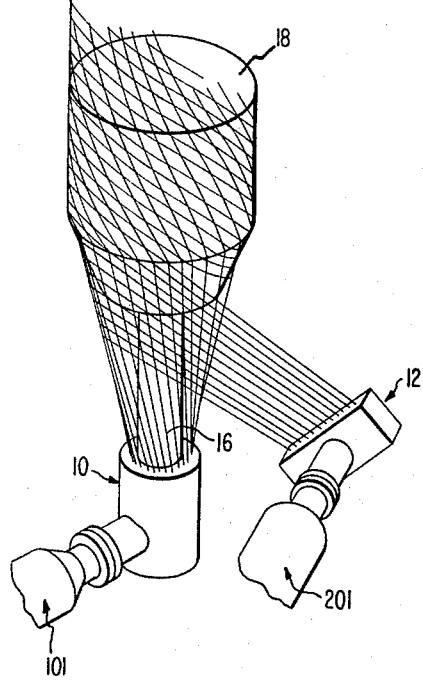
FIG. 1 is a schematic perspective view showing the novel arrangement of the extruder dies in conjunction with the rotary mandrel of the present invention.

An embodiment of the invention process and apparatus will now be described in detail by referring to the drawings.

Figure 2:
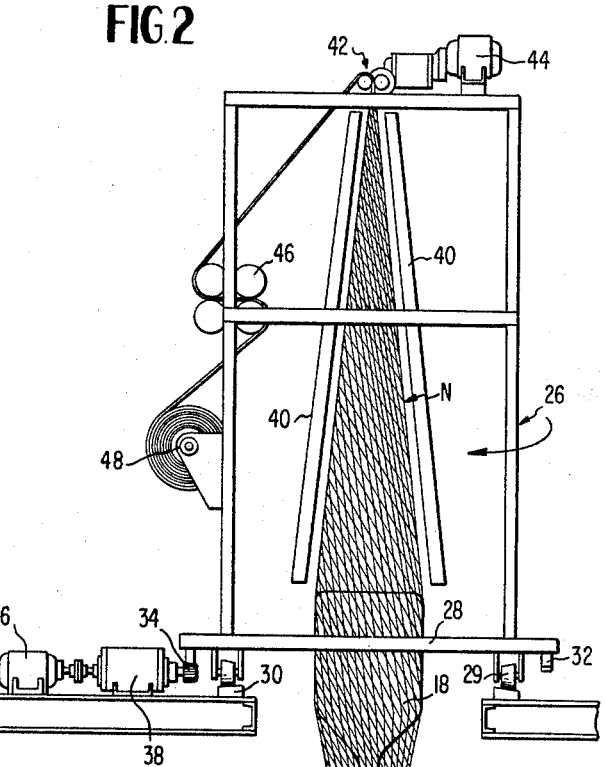
FIG. 2 is a schematic front view of a complete apparatus for practicing the present invention showing, in addition to that illustrated by FIG. 1, an extruder, drive means for the mandrel, and take-up means for the plastic net formed.

In FIGS. 1 and 2 there is illustrated an apparatus for carrying out the invention in a melt extrusion process in which two sets of extrusion nozzles are employed for extrusion of a synthetic thermoplastic resin.

The extruder 2 is conventional and includes the usual hopper 4 for the thermoplastic material. From the hopper 4 there extends a suitably heated extruder barrel 6 in which an extruder screw or worm is mounted and continuously rotated to maintain a forced feed of the plastic material into a feed chamber 8 and out through a circular die 10 and a planar die 12. As is well known in the art, chamber 8 is surrounded by an electrically heated jacket 14 or other heating means which maintains the plastic mass delivered by the screw at an appropriate extrusion temperature. Positioned at the top of chamber 8 and within circular die 10 is a rotatable shaft 16 on which is mounted mandrel 18. The shaft 16 is connected through appropriate gearing (not shown) in chamber 8 to reduce gearing 20 and drive means 23. Conventional gland means (not shown) are provided in the upper part of chamber 8 in addition to gland means 24 so as to provide an effective seal between the shaft 16 and chamber 8.

Positioned above the rotary mandrel 18, on which the strands from circular die 10 and planar die 12 are collected, is a tower 26 which is rotated in the same direction as mandrel 18. The base 28 of the tower 26 is mounted on wheels 29 which run on a circular track 30. A rack 32 on the base 28 engages a pinion gear 34 which is driven by motor 36 through reducing gears 38. Members 40 are also provided which direct the formed netting N to take-up rolls 42 driven by motor 44 and thereafter transferred over idler roller 46 to storage roll 48.

In operation the plastic mass is forced from the extruder 2 through dies 10 and 12 to produce a plurality of soft and tacky strands or plastic streams which are collected on the rotating mandrel 18. Where the soft strands from dies 10 and 12 intersect, a bonding takes place which produces the desired mesh structure of the netting formed.

The netting N as it passes over the mandrel 18 is then drawn up by the take-up rolls 42 and simultaneously rotated in the same direction and at the same speed as the rotary mandrel 18 due to the motor 36 driving the gear 34 which engages circular rack 32 and causes tower 26 to revolve about mandrel 18 on wheels 29 over circular track 30. In this connection the tower 26 can be described as facilitating the advance of the netting N to the take-up rolls 42. As the netting N moves rotatingly upward from mandrel 18, a cooling of the netting N occurs so that the meshed fabric N is completely set or fixed. If necessary auxiliary cooling means (not shown) may be provided in association with mandrel 18 and tower 26 so as to insure the firm setting of the netting N as it passes between guide members 40 and take-up rolls 42. The resulting flattened netting N then passes over idler rolls 46 and onto storage roll 48.

It will be noted that the circular die 10 and planar die 12 (FIG. 1) are connected to separate extruder members 101 and 201 which are similar in operation to extruder 2. The arrangement in FIG. 1 is particularly useful when it is desired to extrude a plastic material from die 10 which differs in color from the plastic extruded from die 12.

Figure 3:
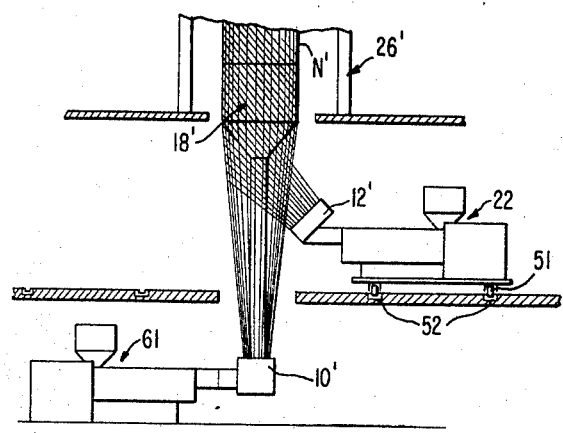
FIG. 3 is a schematic front view of a modification showing a different arrangement of the extruders.

A modified form of the invention is shown in FIG. 3 wherein the take-up tower 26', similar to tower 26, and mandrel 18' are fixed while one of the extruders 22 leading to planar die 12' is mounted on wheels 51 which permit the extruder 22 to revolve in a fixed circular path 52. Means (not shown) similar to that shown in FIG. 2 such as the rack 32, pinion gear 34 and power means 36, as shown in FIG. 2, can also be used for revolving extruder 22 around fixed mandrel 18'. The circular die 10' of FIG. 3 is connected to fixed extruder 61. In operation, the apparatus of FIG. 3 will result in the extruding of a plurality of soft plastic strands from planar die 12' which strands will be wrapped about the vertical soft strands of plastic issuing from circular die 10' due to the rotary movement of extruder 22 over tracks 52. Since the mandrel 18' is not rotating, the netting N' formed will have a mesh configuration different from that produced by the apparatus of FIG. 1. It will be noted that the modification shown in FIG. 3 only requires the revolution of the extruder 22 about the fixed mandrel 18' and in addition, the tower is not rotated about the mandrel as required in FIG. 1.

A further modified form of the invention is shown in FIGS. 4 and 5 wherein a circular die 10" and a planar die 12", which may be connected to separate extruders as in FIG. 1 or to the same extruder as in FIG. 2, are so mounted as to cause the plurality of soft plastic strands issuing from the dies to flow downwardly over rotating mandrel 18". In this modification, power means (not shown) connected to shaft 76 drives a gear assembly 77 comprising external spur gears 78 and 80, internal spur gears 82 and 84, and intersecting bevel gears 86 and 88 to impart a compound revolving and rotating motion to feed rolls 90 which contact the formed netting N" to advance the same to a vertically reciprocating cutoff means 92. The means (not shown) for reciprocating cutoff means 92 is so timed as to cut off the tubular netting N", which is in a set condition, at any desired length. This construction is particularly desirable for producing tubular netting of varying lengths such as those used in making, for example, bags.

Plastic mass as used in the present invention contemplates any thermoplastic or thermosetting resin, including mixtures thereof, capable of melt extrusion or compression extrusion in a molten state through dies and settable by a cooling medium on issuance from the dies. Representative of such resins are the polyamides, polyesters, vinyl polymers, polyolefins, and rubbers.

In the embodiments disclosed in FIGS. 1, 2 and 3 above, the take-off means and mandrel are shown mounted above the extruder. However, it will be apparent to those skilled in the art that the take-off means in these embodiments could be mounted below the extruder as shown in FIG. 4 and as is well known in the art (see FIG. 5 of U.S. Patent No. 2,919,467), in the event very tacky and fluid streams of plastic are being extruded.

It will also be understood that the nature of the mesh fabric produced can be varied by the relative number, size, and spacing of the openings in the planar and/or circular dies employed. Moreover, the nature or the pattern of the fabric mesh formed will depend on whether the mandrel rotates counter or in the same direction as the planar die in those instances or modifications wherein the planar die rotates. In this connection, it will be apparent that the apparatus shown for forcing and feeding the fluid plastic through the planar or circular dies can be substituted by any suitable known form of extrusion feeding and pressure apparatus. Regardless of the form of the extrusion feeding and pressure apparatus, it is to be understood that the plastic mass as it issues from the circular and planar dies is of such a fluid or tacky nature that the strands issuing from the openings in the dies will adhere to each other. It also follows that the strands may be of any cross-sectional shape.

Although fluid cooling of the netting formed from the intermeshing of the extruded plastic strands is contemplated, it is to be understood that either a gas or liquid can be employed for this purpose, depending upon the plastic extruded, as is well known in the art.

While various forms of the present invention have been illustrated and described, it is not intended to limit this invention to any of the details herein shown. Thus the embodiments set forth in the above description are merely representative of the general inventive concept disclosed and further modifications will be evident to those familiar with the extrusion art. For example, FIG. 2 could be modified so that planar die 12 would rotate about fixed chamber 8 and fixed circular die 10. With such an arrangement, the softened plastic from extruder 2 would enter chamber 8 from the bottom thereof so as not to interfere with rotating die 12 which is mounted on the outer wall of chamber 8, which wall can be rotated by an appropriate take-off gear means from gearing 20 and drive means 23. An additional sealing means, such as gaskets, would have to be provided between the outer wall of chamber 8 and the stationary top and bottom walls of said chamber. This embodiment has the advantage of being more compact than the modification shown in FIG. 3. Moreover, it will be apparent to those skilled in the art that further changes can be made in the method and apparatus described herein without departing from the spirit and scope of the invention.

What I claim is:

1. A method of forming tubular netting comprising the steps of forming a first group of heat softened strands in a circular array about an axis, forming a second group of heat softened strands in planar array externally of said first group and at an angle to said first axis and with the strands crossing and engaging the outer portions of the strands in the first group, and producing rotation of only said first group of strands about said axis.

2. The method defined in claim 1 wherein said rotation is produced by forming the strands in said first group over a rotating mandrel which rotates about said axis.

3. The method defined in claim 1 further including the steps of advancing the tubular netting along said axis after it is formed while rotating the tubular netting about said axis after it is formed.

4. A method of forming in a single operation mesh fabrics from extrudable plastics comprising extruding a first group of soft plastic strands all running parallel to each other in circular array and spaced about and from an axis; extruding a second group of strands all running parallel to each other in planar array and at an angle to said first group and spaced apart about the same axis; rotating at least one of said groups of strands as they are formed about said axis to cause one group of strands to cross the other group of strands and bond at the crossings thereby to form continuously an open mesh unitary plastic fabric of indefinite length.

5. A method of forming in a single operation mesh fabrics from extrudable plastics comprising extruding from one source of such a plastic a first group of heat-softened strands in circular array and spaced about an axis, extruding a second group of heat-softened strands in planar array at an angle to said first group of strands and about the same axis, rotating only one group of strands as they are formed about said axis to cause one group of strands to cross the other group of strands and bond at the crossings thereby to form continuously an open mesh unitary plastic fabric of indefinite length.

6. Apparatus for producing plastic net comprising an extruder, means for supplying said extruder with plastic material, a first circular extrusion die on said extruder, at least one other extrusion die separate from said first die and having a planar configuration positioned at an angle to said circular extrusion die for extruding and laying plastic streams on the plastic streams formed by said circular extrusion die so as to form a net, and means for imparting a rotary motion to at least one of the strand forming plastic streams formed by said dies.

7. Apparatus of claim 6 wherein the means for imparting a rotary motion to the strand forming plastic streams is a mandrel.

8. The apparatus of claim 6 wherein means are provided for furnishing a plastic material of one color to the circular extrusion die and separate means are provided for furnishing a plastic material of a different color to said planar die.

9. The apparatus of claim 7 in which the mandrel is positioned partly within said formed net.

10. The apparatus of claim 7 wherein a rotary means moving at the same rate and in the same direction as the mandrel is provided for facilitating the advance of the plastic net as it leaves the mandrel.

11. The apparatus of claim 10 wherein a take-up means is provided for receiving the plastic net as it leaves the rotary means for facilitating the advance of the net.

12. Apparatus for producing plastic tubular netting comprising in combination, a first circular extrusion die for extruding a first group of plastic strands in circular array about an axis, a planar extrusion die for extruding plastic strands in planar array, said dies being positioned such that the respective strands extruded therefrom extend at an angle to each other and cross at points of intersection, and means for imparting angular motion about said axis to at least one of the groups of strands.

13. Apparatus defined in claim 12 wherein said last defined means includes means for rotating said planar extrusion die about said axis and said first group of strands.

14. Apparatus defined in claim 12 wherein said last defined means includes a mandrel positioned within the first group of strands, and means for rotating the mandrel about said axis.

15. Apparatus defined in claim 14 further including means for advancing the formed netting off said mandrel along said axis, and guide means for guiding the formed netting off the mandrel along said axis, said guide means being rotatable about said axis.

References Cited

UNITED STATES PATENTS

| 3,234,071 | 2/1966 | Ward et al. | 156—167 XR |
| 3,118,180 | 1/1964 | Nalle | 264—167 |
| 3,123,512 | 3/1964 | Mercer | 156—500 XR |
| 3,308,220 | 3/1967 | Smith | 156—441 |
| 3,178,328 | 4/1965 | Tittmann | 156—167 |
| 2,797,728 | 7/1957 | Slayter et al. | 156—175 |
| 3,164,509 | 1/1965 | Olken | 156—433 XR |

HAROLD ANSHER, Primary Examiner

P. DIER, Assistant Examiner

U.S. Cl. X.R.

18—13; 156—175, 244, 441, 500; 264—167, 173